US009449577B2

(12) United States Patent
Yang et al.

(10) Patent No.: US 9,449,577 B2
(45) Date of Patent: Sep. 20, 2016

(54) DISPLAY DEVICE HAVING SYNCHRONIZATION UNIT AND DRIVING METHOD THEREOF

(71) Applicant: LG DISPLAY CO., LTD., Seoul (KR)

(72) Inventors: Hanmin Yang, Gwangmyeong-si (KR); Ohhyun Lee, Gimcheon-si (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 14/564,583

(22) Filed: Dec. 9, 2014

(65) Prior Publication Data

US 2015/0310824 A1 Oct. 29, 2015

(30) Foreign Application Priority Data

Apr. 29, 2014 (KR) ........................ 10-2014-0051877

(51) Int. Cl.

| | |
|---|---|
| ***G06F 3/038*** | (2013.01) |
| ***G09G 5/00*** | (2006.01) |
| ***G09G 3/20*** | (2006.01) |
| *G09G 3/36* | (2006.01) |

(52) U.S. Cl.

CPC ................ *G09G 5/006* (2013.01); *G09G 3/20* (2013.01); *G09G 3/3648* (2013.01); *G09G 2310/027* (2013.01); *G09G 2310/0297* (2013.01); *G09G 2310/08* (2013.01); *G09G 2330/021* (2013.01); *G09G 2330/12* (2013.01); *G09G 2370/08* (2013.01); *G09G 2370/10* (2013.01); *G09G 2370/14* (2013.01)

(58) Field of Classification Search

CPC ............ G09G 3/36; G09G 3/34; G09G 3/30; G09G 5/00; G06F 3/038; G05F 1/00; H04B 37/02; H04B 39/04; H04B 41/36; H04B 37/00; H04B 39/00; H04B 41/00

See application file for complete search history.

(56) References Cited

U.S. PATENT DOCUMENTS

| | | | | | |
|---|---|---|---|---|---|
| 2010/0026203 | A1* | 2/2010 | Zhao | H05B 33/0815 | 315/291 |
| 2011/0175881 | A1* | 7/2011 | Kim | G09G 3/3225 | 345/211 |
| 2011/0242066 | A1* | 10/2011 | Jeon | G09G 3/20 | 345/204 |
| 2012/0162178 | A1* | 6/2012 | Oh | G09G 3/3648 | 345/211 |
| 2012/0320019 | A1* | 12/2012 | Jeong | G09G 3/2096 | 345/211 |
| 2013/0050176 | A1* | 2/2013 | Kim | G09G 3/36 | 345/214 |
| 2014/0077725 | A1* | 3/2014 | Lee | H05B 37/02 | 315/312 |
| 2014/0118235 | A1* | 5/2014 | Hong | G09G 5/008 | 345/87 |

* cited by examiner

*Primary Examiner* — Pegeman Karimi

(74) *Attorney, Agent, or Firm* — Dentons US LLP

(57) ABSTRACT

Disclosed is a display device that may include a first data driver and a second data driver, each checking availability of a data transmission with a timing controller upon receiving a power voltage; a synchronization unit that outputs a power management signal when both the first and second data drivers become available for their data transmission with the timing controller; and a power module that supplies a high-potential voltage to the first and second data drivers in response to the power management signal output from the synchronization unit.

18 Claims, 5 Drawing Sheets

※ UI : Unit Interval

DISPLAY DEVICE HAVING SYNCHRONIZATION UNIT AND DRIVING METHOD THEREOF

CROSS-REFERENCE TO RELATED APPLICATIONS

This application claims the benefit of the Korean Patent Application No. 10-2014-0051877 filed on Apr. 29, 2014, which is hereby incorporated by reference for all purposes as if fully set forth herein.

BACKGROUND OF THE INVENTION

1. Field of the Invention

The present invention relates to a display device and method of driving the same, and more particularly, to a display device having a source drive integrated circuit (or data driver) with improved reliability.

2. Discussion of the Related Art

A display device typically includes a plurality of source drive integrated circuits (hereinafter, "ICs") for supplying data voltages to the data lines of a display panel, a plurality of gate drive ICs for sequentially supplying a gate pulse (or scan pulse) to the gate lines of the display panel, and a timing controller for controlling the source and gate drive ICs.

The timing controller supplies digital video data, a clock for sampling the digital video data, a control signal for controlling an operation of the source drive ICs, and the like, to the source drive ICs through an interface such as a mini low-voltage differential signaling (LVDS) interface. The source drive ICs converts the digital video data input from the timing controller into analog data voltages and supply them to the data lines.

When connecting the timing controller and the source drive ICs in a multi-drop manner through the mini LVDS interface, many signal lines including R data transmission lines, G data transmission lines, B data transmission lines, control lines for controlling the operation timing of output and polarity conversion of the source drive ICs, clock transmission lines, etc. are required between the timing controller and the source drive ICs.

In RGB data transmission, for example, RGB digital video data and a clock are each transmitted in differential signal pairs through the mini-LVDS interface. As a result, when odd data and even data are simultaneously transmitted, at least 14 signal lines may be needed between the timing controller and the source driver ICs for the transmission of the RGB data. If RGB data is a 10-bit data, 18 signal lines may be needed. Thus, many signal lines are to be formed on a source printed circuit board (PCB) mounted between the timing controller and the source drive ICs, which may make it difficult to reduce the width of the source PCB.

The present applicant proposed a new data transmission protocol (hereinafter, referred to as "Embedded Panel Interface (EPI) protocol") for connecting a timing controller and source driver ICs in a point-to-point manner to reduce or minimize the number of signal lines between the timing controller and the source driver ICs and to stabilize signal transmission in Korean Patent Application No. 10-2008-0127458 (filed on Dec. 15, 2008), U.S. patent application Ser. No. 12/543,996 (field on Aug. 19, 2009), Korean Patent Application No. 10-2008-0127456 (filed on Dec. 15, 2008), U.S. patent application Ser. No. 12/461,652 (field on Aug. 19, 2009), Korean Patent Application No. 10-2008-0132466 (filed on Dec. 23, 2008), and U.S. patent application Ser. No. 12/547,341 (field on Aug. 7, 2009).

The EPI protocol may satisfy the following interface regulations (1) to (3).

(1) A transmitting terminal of the timing controller is connected to receiving terminals of the source driver ICs via data line pairs in a point-to-point manner without sharing the lines. (2) No separate clock line pairs are connected between the timing controller and the source driver ICs. The timing controller transmits video data and control data, each along with a clock signal, to the source driver ICs via the data line pairs. (3) A clock recovery circuit for clock and data recovery (CDR) is embedded in each of the source driver ICs. The timing controller transmits a clock training pattern signal or a preamble signal to the source driver ICs so that then the phase and frequency of the output of the clock recovery circuit should be locked. When the clock training pattern signal and the clock signal are input via the data line pairs, the clock recovery circuits embedded in the source drive ICs generate internal clocks.

When the phase and frequency of each internal clock are locked, the source driver ICs feed a lock signal LOCK of a high logic level indicating a stabilized output back as an input to the timing controller. The lock signal LOCK is fed back as an input to the timing controller through a lock feedback signal line connected to the timing controller and the last source driver IC.

In the EPI protocol, the timing controller transmits the clock training pattern signal to the source drive ICs before transmitting control data and video data of an input image. The clock recovery circuit of one of the source drive ICs outputs an internal clock based on the clock training pattern signal to recover the clock and perform a clock training operation. When the phase and frequency of the internal clock are stably locked, the clock recovery circuit of the source drive IC and the timing controller establish a data link. After establishing a data link with the timing controller, the source drive IC sends the lock signal LOCK to the next source drive IC. The timing controller starts to transmit the control data and the video data to the source drive ICs in response to the lock signal LOCK received from the last source drive IC.

In this procedure, the lock signal LOCK may not be sent to the next source drive IC when there is an abnormality or malfunction in the source drive IC. As a result, the lock signal LOCK does not make it to the timing controller, and the timing controller cannot thus supply a data voltage to the source drive ICs.

Recently, a method of supplying data voltages simultaneously to both ends of the data lines has been used in order to make up for a data voltage drop which may occur due to the longer distance between the source drive ICs and the data lines during the supply of the data voltages to a large-sized display panel. That is, first source drive ICs are electrically connected to one end of the data lines, while second source drive ICs are electrically connected to the other end of the data lines. Thus, the first and second source drive ICs simultaneously supply the data voltages to the data lines.

In the EPI protocol, when some of the first and second source drive ICs fail to establish data links with the timing controller, they may not supply the data voltages to the data lines. On the other hand, normally operating source drive ICs supply the data voltages to those data lines from the other side of the data lines. As a result, as the data lines receive the data voltages from the normally operating source drive ICs, the malfunctioning source drive ICs formed at the other end of the data lines may be burned by a sink current.

SUMMARY OF THE INVENTION

Accordingly, the present invention is directed to provide a display device and method of driving the same that substantially obviates one or more problems due to limitations and disadvantages of the related art.

An advantage of the present invention is to provide a display device that may reduce or prevent a data driver (or source drive IC) from being burnt due to a sink current.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a first data driver and a second data driver, each checking availability of a data transmission with a timing controller upon receiving a power voltage; a synchronization unit that outputs a power management signal when both the first and second data drivers become available for their data transmission with the timing controller; and a power module that supplies a high-potential voltage to the first and second data drivers in response to the power management signal output from the synchronization unit.

In another aspect of the present invention, a method of driving a display device may, for example, include generating a power management signal when a data transmission between a timing controller and a data driver is available; and supplying a high-potential voltage to the data driver in response to the power management signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts. Detailed description of well-known elements or configurations may be omitted.

A display device according to an embodiment of the present invention may be implemented as a flat panel display such as a liquid crystal display (LCD), a field emission display (FED), a plasma display panel (PDP), or an organic light emitting diode display (OLED). Although the liquid crystal display will be described as an example in the following description, it should be appreciated that the present invention is not limited to this example and can be applied to various types of display devices and other electronic devices.

Figure 1:
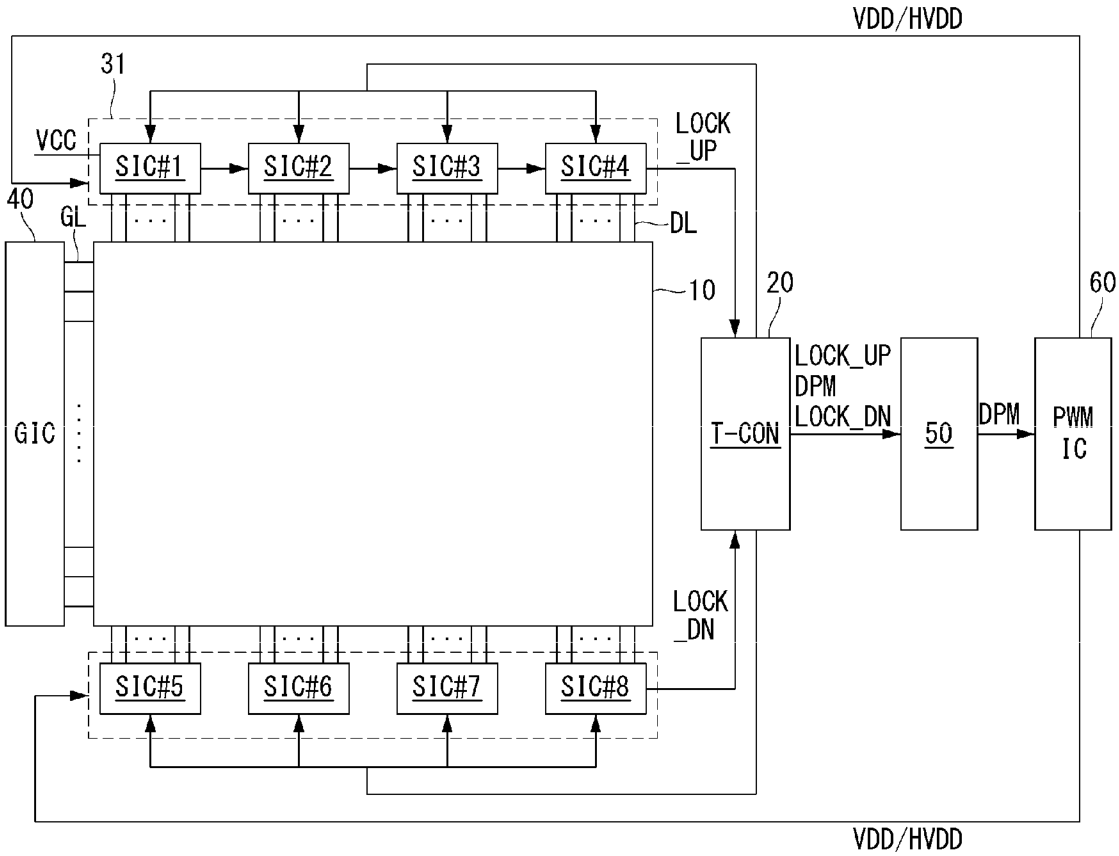
FIG. 1 is a view illustrating a display device according to an embodiment of the present invention.

FIG. 1 is a view illustrating a display device according to an embodiment of the present invention. Referring to FIG. 1, a liquid crystal display device according to an exemplary embodiment of the present invention includes a liquid crystal display panel 10, a timing controller 20, first and second sets of data drivers 31 and 32, and gate drive ICs 40.

The liquid crystal display panel 10 includes a liquid crystal layer between substrates. The liquid crystal display panel 10 also includes a pixel array of a plurality of liquid crystal cells disposed in a matrix near crossings of data lines DL and gate lines GL.

The pixel array, which includes the data lines DL, the gate lines GL, thin film transistors (TFTs) and storage capacitors, is formed on a TFT array substrate of the liquid crystal display panel 10. Each of the liquid crystal cells is driven by an electric field between a pixel electrode, to which a data voltage is supplied through the TFT, and a common electrode, to which a common voltage is supplied. Gate electrodes of the TFTs are electrically connected to the gate lines GL, and drain electrodes of the TFTs are electrically connected to the data lines DL. Source electrodes of the TFTs are electrically connected to the pixel electrodes of the liquid crystal cells.

The TFTs are turned on in response to a gate pulse supplied thorough the gate lines GL to supply data voltages from the data lines DL to the pixel electrodes of the liquid crystal cells. A black matrix, color filters, the common electrode, etc. are formed on a color filter substrate of the liquid crystal display panel 10. Polarizers are respectively attached to the TFT array substrate and color filter array substrate of the liquid crystal display panel 10, and alignment layers for setting a pre-tilt angle of liquid crystals are respectively formed on them. A spacer for maintaining a cell gap of the liquid crystal cells may be formed between the TFT array substrate and color filter array substrate of the liquid crystal display panel 10.

The liquid crystal display panel 100 may be implemented in a vertical electric field driving manner such as a twisted nematic (TN) mode and a vertical alignment (VA) mode, or in a horizontal electric field driving manner such as an in-plane switching (IPS) mode and a fringe field switching (FFS) mode. The liquid crystal display device according to an embodiment of the present invention may be implemented in various configurations including a transmissive liquid crystal display, a semi-transmissive liquid crystal display, and a reflective liquid crystal display. The transmissive liquid crystal display and the semi-transmissive liquid crystal display typically require a backlight unit. The backlight unit may be a direct type backlight unit or an edge type backlight unit.

The timing controller 20 receives external timing signals such as vertical/horizontal synchronization signals Vsync/Hsync, an external timing signal DE, and a main clock CLK from an external host system (not shown) through an interface such as a low voltage differential signaling (LVDS) interface and a transition minimized differential signaling (TMDS) interface. The timing controller 20 is serially, electrically connected to source drive ICs SIC#1 to SIC#8 via data line pairs. In accordance with the aforementioned EPI protocol, the timing controller 20 transmits digital video data of an input image to the source drive ICs SIC#1 to SIC#8 and controls operation timings of the source drive ICs SIC#1 to SIC#8 and gate drive ICs 40. The timing controller 20 converts a clock training pattern signal, control data, and the digital video data of the input image into differential signal pairs and serially transmits them to the source drive ICs SIC#1 to SIC#8 via the data line pairs according to a signaling standard defined by the EPI protocol.

After receiving a lock signal LOCK of a high logic level from the last source drive IC SIC#4, the timing controller 20 serially transmits the control data and the video data, each with an EPI clock embedded therein, to the source drive ICs SIC#1 to SIC#8. The control data may include source control data for controlling output timings of data voltage outputs from the source drive ICs SIC#1 to SIC#8 and polarities of the data voltages. The control data may also include gate control data for controlling operation timings of the gate drive ICs 40.

The timing controller 20 receives a first lock signal from the fourth source drive IC SIC#4 of the first set of data drivers 31, and sends the first lock signal LOCK_UP to a synchronization unit 50. Also, the timing controller 20 receives a second lock signal from the eighth source drive IC SIC#8 of the second set of data drivers 32, and sends the second lock signal LOCK_DN to the synchronization unit 50. At the same time, the timing controller 20 transmits a dynamic power management (DPM) signal to the synchronization unit 50.

The first and second sets of data drivers 31 and 32 receive video data from the timing controller 20, and convert the video data into analog data voltages by using a high-potential reference voltage VDD and a mid-potential reference voltage HVDD that are supplied from a power module 60.

Upon receiving a DC power voltage VCC, the first and second sets of data drivers 31 and 32 check whether or not a CDR function for generating an internal clock signal is stabilized.

To check the stability of the CDR function, the DC power voltage VCC of a high logic level is input into a lock signal input terminal of the first source drive IC SIC#1, which is the first source drive IC of the first set of data drivers 31. Upon receiving the DC power voltage VCC, the first source drive IC SIC#1 generates an output of the clock recovery circuit in response to the clock training pattern signal supplied from the timing controller 20. When the phase and frequency of the output are locked and the CDR function is therefore stabilized, the first source drive IC SIC#1 transmits a lock signal of a high logic level to the second source drive IC SIC#2. Upon receiving the lock signal from the first source drive IC SIC#1, the second source drive IC SIC#2 transmits a lock signal to the third source drive IC SIC#3 in response to the clock training pattern signal when the CDR function of the clock recovery circuit is stabilized. In this way, when the CDR functions of the first to fourth source drive ICs SIC#1 to SIC#4 included in the first set of data drivers 31 are all stabilized, the fourth source drive IC SIC#4, which is the last one in the first set of data drivers 31, transmits the first lock signal LOCK_UP of a high logic level to the timing controller 20 through a lock feedback signal line.

Similarly, the DC power voltage VCC of the high logic level is input into a lock signal input terminal of the fifth source drive IC SIC#5, which is the first source drive IC of the second set of data drivers 32. Upon receiving the DC power voltage VCC, the fifth source drive IC SIC#5 generates an output of the clock recovery circuit in response to the clock training pattern signal supplied from the timing controller 20. When the phase and frequency of the output are locked and the CDR function is therefore stabilized, the fifth source drive IC SIC#5 transmits a lock signal of a high logic level to the sixth source drive IC SIC#6. In this way, when the CDR functions of the fifth to eighth source drive ICs SIC#5 to SIC#8 included in the second set of data drivers 32 are all stabilized, the eighth source drive IC SIC#8, which is the last one in the second set of data drivers 32, transmits the second lock signal LOCK_DN of the high logic level to the timing controller 20 through the lock feedback signal line.

The source drive ICs SIC#1 to SIC#8 included in the first and second sets of data drivers 31 and 32 may be electrically connected to the data lines of the liquid crystal display panel 10 by a COG (Chip On Glass) or TAB (Tape Automated Bonding) process. The source drive ICs SIC#1 to SIC#8 receive a clock training pattern signal, control data, and video data, each with an EPI clock embedded therein, via the data line pairs. The CDR circuits of the source drive ICs SIC#1 to SIC#8 provide the EPI clock to their clock recovery circuits to generate (number of RGB bits×2) internal clocks of the video data. Using a phase locked loop (hereinafter, referred to as "PLL") or delay locked loop (hereinafter, referred to as "DLL"), the clock recovery circuits output the internal clocks and a mask signal, and generate a lock signal LOCK. The source drive ICs SIC#1 to SIC#8 sample digital video data (RGB bits) of the input image in accordance with their internal clock timings and then convert the sampled RGB bits into parallel data.

The source drive ICs SIC#1 to SIC#8 decode the control data input via the data line pairs in a code mapping manner and recover the source control data and the gate control data. In response to the recovered source control data, the source drive ICs SIC#1 to SIC#8 convert the digital video data of the input image into positive/negative analog video data voltages and supplies them to the data lines DL of the liquid crystal display panel 10. The source drive ICs SIC#1 to SIC#8 may transmit the gate control data to at least one of the gate drive ICs 40.

Figure 2:
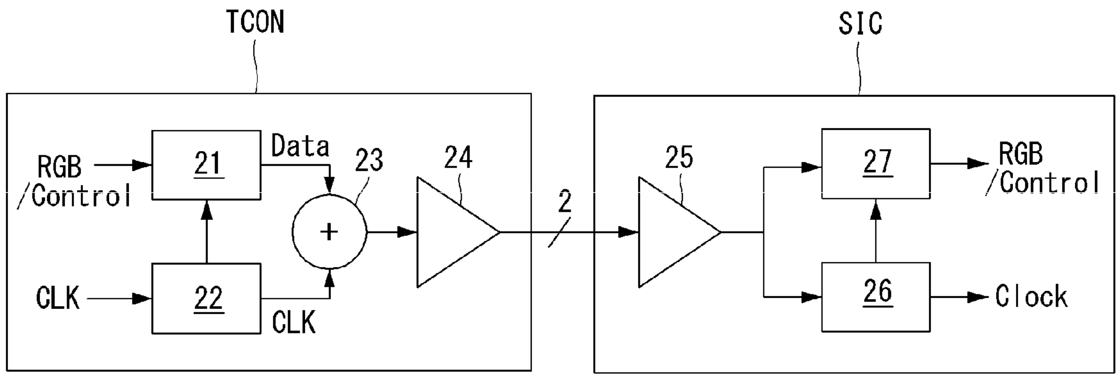
FIG. 2 is a circuit diagram illustrating a timing controller and a CDR circuit of a source drive IC according to an embodiment of the present invention.

FIG. 2 is a circuit diagram illustrating a timing controller and a CDR circuit of a source drive IC according to an embodiment of the present invention. The source drive IC SIC illustrated in FIG. 2 is any one of the source drive ICs SIC#1 to SIC#4, and its internal circuit includes the CDR circuit.

Referring to FIG. 2, the timing controller 20 receives digital video data RGB of an input image from a host system through an LVDS or TMDS interface. The timing controller 20 generates control data including source control data and gate control data, based on timing signals input from the host system, by using an internal timing control signal generation circuit. The timing controller 20 rearranges timings of the clocks and digital video data RGB input from the host system through the LVDS or TMDS interface in accordance with timings of the source and gate drive ICs. Also, in accordance with the EPI protocol, the timing controller 20 embeds a clock between each data signal, and converts the data signals embedded with the clock into a differential signal pair and transmits it through a transmission buffer 24. The different signal pair is transmitted via a data line pair.

The timing controller 20 converts a clock training pattern signal, control data and the digital video data of the input image into differential signal pairs and serially transmits them to the source drive ICs SIC#1 to SIC#8 via the data line pairs according to a signaling standard defined by the EPI protocol.

A receive buffer 25 of the source drive IC SIC receives the differential signal pair transmitted from the timing controller 20 via the data line pair. The clock recovery circuit 26 of the source drive IC SIC recovers an internal clock from the received EPI clock, and the sampling circuit 27 of the source drive IC SIC samples data bits from the control data and the digital video data, respectively, in accordance with the internal clock.

The gate drive ICs 40 may be connected to the gate lines of the TFT array substrate of the liquid crystal panel by a TAP process, or formed directly on the TFT array substrate of the liquid crystal display panel 10 by a GIP (Gate in Panel) process. The gate drive ICs 40 sequentially supply a gate pulse synchronized with positive/negative analog video data voltages to the gate lines GL in response to gate control data received from the timing controller 20 or received through the source drive ICs SIC#1 to SIC#4.

Figure 3:
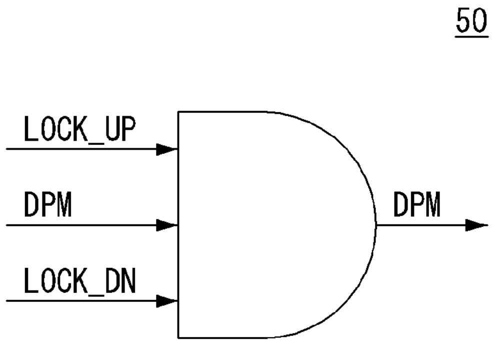
FIG. 3 is a circuit diagram illustrating a synchronization unit according to an embodiment of the present invention.

The synchronization unit 50 receives first and second lock signals LOCK_UP and LOCK_DN and a DPM signal from the timing controller 20. If all of the input signals have a high logic level, the synchronization unit 50 outputs the DPM signal to the power module 60. To this end, the synchronization unit 50 may use a logical AND operator, as illustrated in FIG. 3.

The power module 60 generates a high-potential reference voltage VDD and a mid-potential reference voltage HVDD in response to the DPM signal, and supply the high-potential reference voltage VDD and the mid-potential reference voltage HVDD to the source drive ICs SIC#1 to SIC#8.

Figure 4:
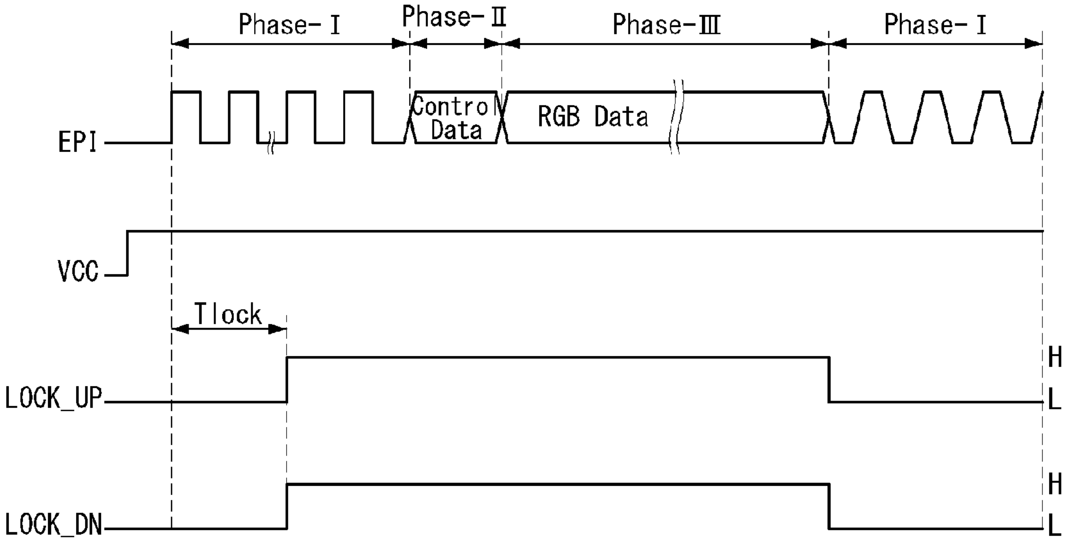
FIG. 4 is a waveform diagram illustrating an EPI protocol for signal transmission between a timing controller and source drive ICs according to an embodiment of the present invention.

FIG. 4 is a waveform diagram illustrating an EPI protocol for signal transmission between the timing controller and source drive ICs illustrated in FIG. 2.

Referring to FIG. 4, the timing controller 20 transmits a clock training pattern signal (or preamble signal) having a constant frequency to the first to fourth source drive ICs SIC#1 to SIC#4 of the first set of data drivers 31 during a first phase (Phase-I). Upon receiving a first lock signal LOCK_UP of a high logic level through a lock feedback signal line, the timing controller 20 proceeds to the second phase (Phase-II) of signal transmission.

During the second phase (Phase-II), the timing controller 20 transmits control data to the first to fourth source drive ICs SIC#1 to SIC#4. If the first lock signal LOCK_UP is maintained at the high logic level, the timing controller 20 proceeds to the third phase (Phase-III) of signal transmission to transmit video data (RGB data) of an input image to the source drive ICs SIC#1 to SIC#4.

Similarly, the timing controller 20 transmits a clock training pattern signal having a constant frequency to the fifth to eighth source drive ICs SIC#5 to SIC#8 of the second set of data drivers 32 during the first phase (Phase-I). Upon receiving a second lock signal LOCK_DN of a high logic level through a lock feedback signal line, the timing controller 20 proceeds to the second phase (Phase-II) of signal transmission. During the second phase (Phase-II), the timing controller 20 transmits control data to the fifth to eighth source drive ICs SIC#5 to SIC#8. If the second lock signal LOCK_DN is maintained at the high logic level, the timing controller 20 proceeds to the third phase (Phase-III) of signal transmission to transmit video data (RGB data) of the input image to the source drive ICs SIC#5 to SIC#8.

In FIG. 4, "Tlock" denotes the time taken from the start of input of a clock training pattern signal into either the first to fourth source drive ICs SIC#1 to SIC#4 or the fifth to eighth source drive ICs SIC#5 to SIC#8 until the output of the clock recovery circuits of either the first to fourth source drive ICs SIC#1 to SIC#4 or the fifth to eighth source drive ICs SIC#5 to SIC#8 is locked and a lock signal is inverted to a high logic level H. The time Tlock may be longer than at least one horizontal period. One horizontal period is the time taken to write image data to the liquid crystal cells arranged in one horizontal line of the liquid crystal display panel 10.

Figure 5:
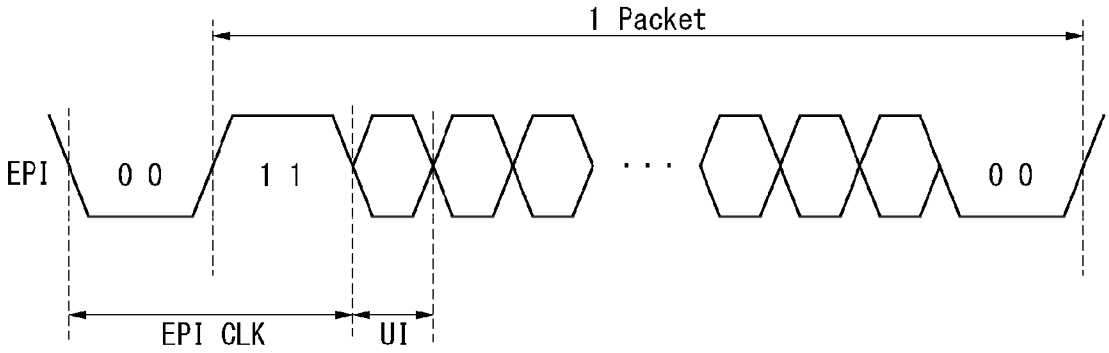
FIG. 5 is a waveform diagram illustrating a length of one packet of data according to an EPI protocol.

FIG. 5 is a waveform diagram illustrating a length of one packet of data according to an EPI protocol.

Referring to FIG. 5, one packet of data transmitted to the first to eighth source drive ICs SIC#1 to SIC#8 according to the EPI protocol contains multiple data bits and clock bits allocated before and after the data bits. The data bits are the bits of control data or input image digital video data. It takes one UI (unit interval) of time for 1 bit to be transmitted, which depends on a resolution of the liquid crystal display panel 10 or a number of data bits.

The clock bits are allocated for 4 UIs between the data bits of one of two neighboring packets and the data bits of the other packet, and their logic value may be "0 0 1 1 (or L L H H)". For example, if the number of data bits is 10, one packet may contain 30 UIs of RGB data bits and 4 UIs of clock bits. If the number of data bits is 8, one packet may contain 24 UIs of RGB data bits and 4 UIs of clock bits. If the number of data bits is 6, one packet may contain 18 UIs of RGB data bits and 4 UIs of clock bits.

Figure 6:
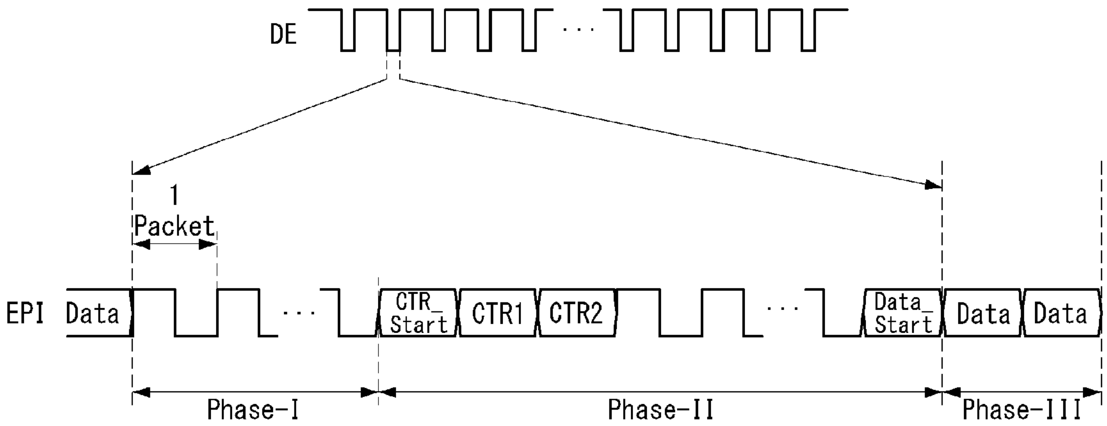
FIG. 6 is a waveform diagram illustrating EPI signals transmitted during a horizontal blank period.

In the EPI protocol, a first phase (Phase-I) signal, a second phase (Phase-II) signal, and a third phase (Phase-III) signal are transmitted to the source drive ICs SIC#1 to SIC#8 every horizontal blank period, as illustrated in FIG. 6. In FIG. 6, "DE" denotes a data enable signal transmitted from the host system to the timing controller 20, and has a pulse width of one horizontal period.

Figure 7:
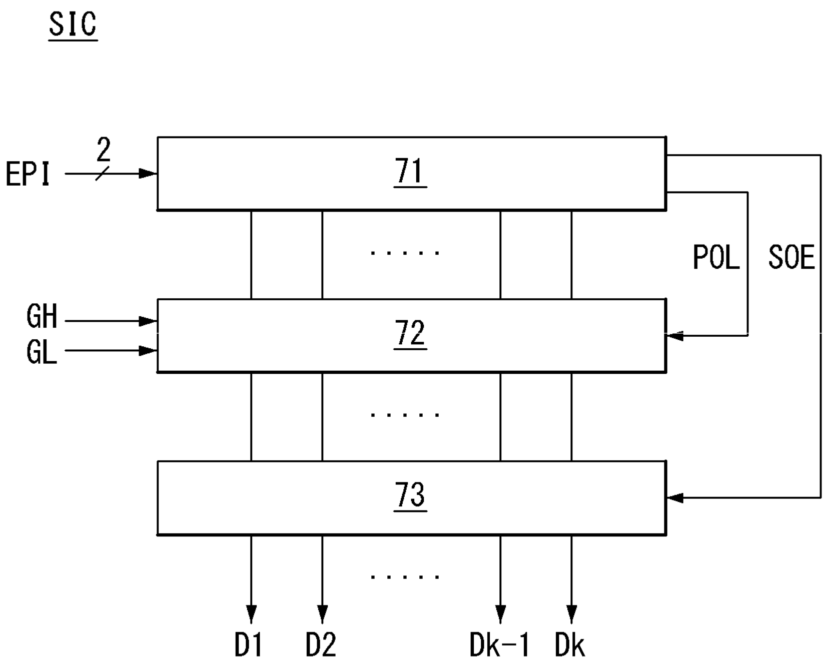
FIG. 7 is a circuit diagram illustrating a configuration of a source drive IC.

FIG. 7 is a circuit diagram illustrating a configuration of the source drive ICs SIC#1 to SIC#8.

Referring to FIG. 7, the first to fourth source drive ICs SIC#1 to SIC#4 each supply positive/negative data voltages to k data lines D1 to Dk (where k is a positive integer). The fifth to eighth source drive ICs SIC#5 to SIC#8 each supply data voltages to k data lines D1 to Dk from a direction opposite to where the first to fourth source drive ICs SIC#1 to SIC#4 supply.

Each of the first to eighth source drive ICs SIC#1 to SIC#8 includes a data sampler and serial-parallel converter 71, a digital-to-analog converter (hereinafter, referred to as "DAC") 72, and an output circuit 73.

The data sampler and serial-parallel converter 71 multiplies or delays an EPI clock CLK received from the timing controller 20 to recover an internal clock by the clock recovery circuit and sample data bits from RGB digital video data of an input image serially input via data line pairs in accordance with the internal clock. Then, the data sampler and serial-parallel converter 71 latches the sampled data bits and then converts them into parallel data by simultaneously outputting them.

The data sampler and serial-parallel converter 71 includes the CDR circuit illustrated in FIG. 2. The data sampler and serial-parallel converter 71 recovers control data received via the data line pairs in a code mapping manner to generate source control data. If the control data has gate control data encoded in it, the data sampler and serial-parallel converter 71 recovers the gate control data from the control data input via the data line pairs and transmits it to the gate drive ICs 40. The source control data may include a source output enable signal SOE, a polarity control signal POL, etc. The polarity control signal POL indicates the polarity of a positive/negative analog data voltage supplied to the data lines D1 to Dk. The source output enable signal SOE controls the data output timing and charge sharing timing of the source drive ICs SIC#1 to SIC#8. If the display device is not a liquid crystal display, the polarity control signal POL may be omitted. The gate control data may include a gate start pulse, a gate output enable signal, etc.

The DAC 72 converts the video data input from the data sampler and serial-parallel converter 72 into positive/negative analog video data voltages using positive gamma compensation voltages GMAH and negative gamma compensation voltages GMAL. Then, the DAC 72 inverts the polarities of the data voltages in response to the polarity control signal POL.

The output circuit 73 supplies a mean value of the positive and negative data voltages or a common voltage Vcom to the data lines D1 to Dk through the output buffer by charge sharing during a high logic period of the source output enable signal SOE. During the charging sharing time, output channels to which the positive and negative data voltages are supplied from the source drive ICs SIC#1 to SIC#8 are short-circuited to supply, for example, the mean value of the positive and negative data voltages to the data lines D1 to Dk.

Figure 8:
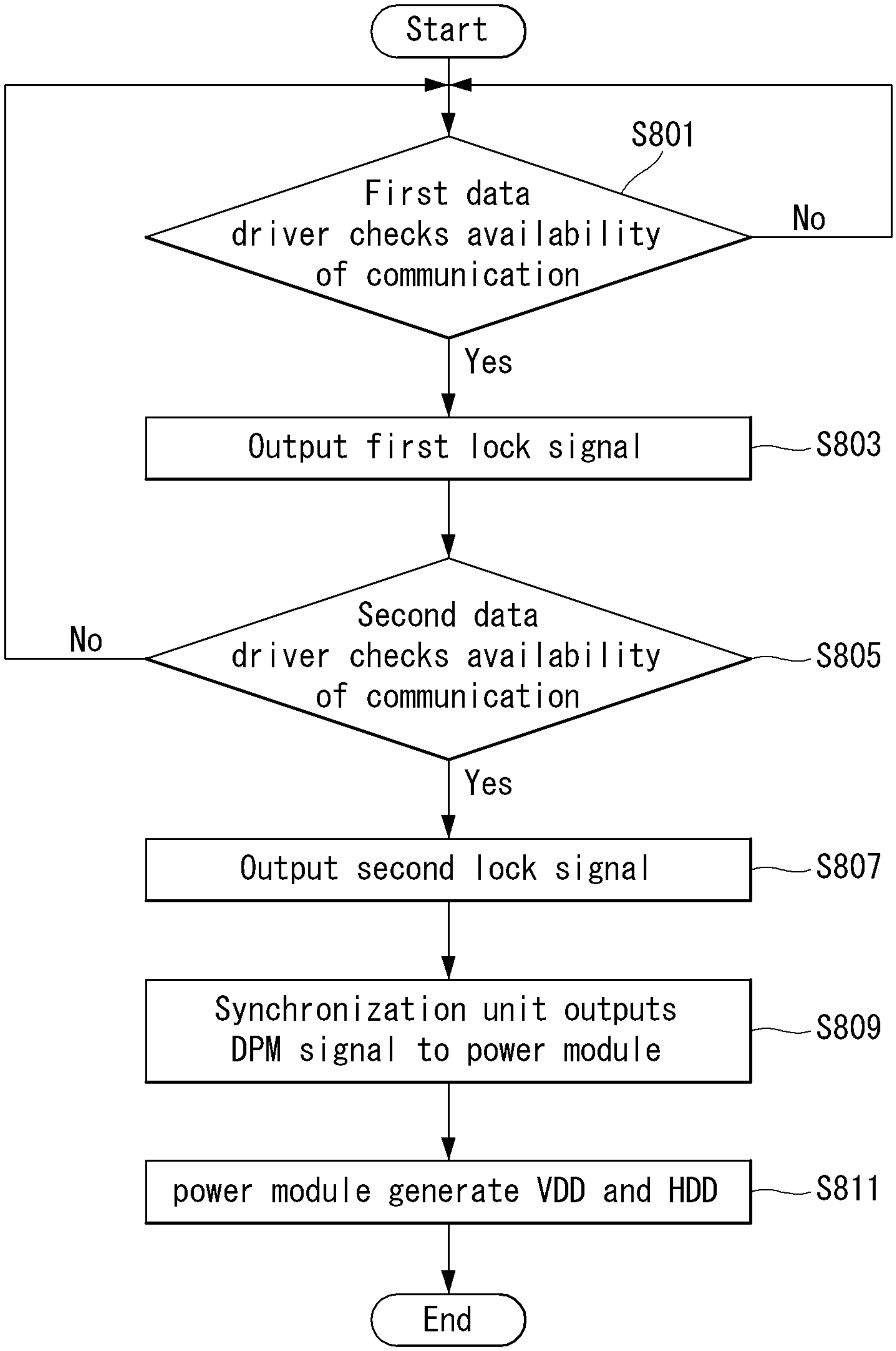
FIG. 8 is a flow chart illustrating a method for driving a liquid crystal display device according to an embodiment of the present invention.

FIG. 8 is a sequential chart illustrating a method for driving a liquid crystal display device according to an embodiment of the present invention.

Referring to FIG. 8, the first set of data drivers 31 checks availability of communication, and outputs a first lock signal LOCK_UP. This step conducted by the first set of data drivers 31 is a process of checking availability of data transmission between the timing controller 20 and the first to fourth source drive ICs SIC#1 to SIC#4 in accordance with the EPI protocol.

To this end, the first source drive IC SIC#1 generates an output of the clock recovery circuit in response to a power voltage VCC, and when the CDR function is stabilized, transmits a first lock signal LOCK_UP to the second source drive IC SIC#2. Upon receiving the first lock signal LOCK_UP from the first source drive IC SIC#1, the second source drive IC SIC#2 generates an output of the clock recovery circuit, and when the CDR function is stabilized, transmits the first lock signal LOCK_UP to the third source drive IC SIC#3. Similarly, when the CDR function is stabilized, the third source drive IC SIC#3 transmits the first lock signal LOCK_UP to the fourth source drive IC SIC#4. When the CDR function is stabilized, the fourth source drive IC SIC#4 transmits the first lock signal LOCK_Up to the timing controller 20 (S801 and S803).

Similarly, the second set of data drivers 32 checks availability of communication, and outputs a second lock signal LOCK_DN. That is, upon receiving the power voltage VCC, the fifth to eighth source drive ICs SIC#5 to SIC#8 of the second set of data drivers 32 sequentially check the stability of their CDR functions, as described with respect to the operation of the first set of data drivers 31. When the CDR functions of the fifth to eighth source drive ICs SIC#5 to SIC#8 are stabilized, the eight source drive IC SIC#8 transmits the second lock signal LOCK_DN to the timing controller 20 (S805 and S807).

The timing controller 20 outputs a DPM signal, along with the first and second lock signals LOCK_UP and LOCK_DN, to the synchronization unit 50.

The synchronization unit 50 receives the first and second lock signals LOCK_UP and LOCK_DN. If all of the input signals have a high logic level, the synchronization unit 50 outputs the DPM signal to the power module 60 (S809).

The power module 60 generates a high-potential reference voltage VDD and a mid-potential reference voltage HVDD in response to the DPM signal input from the synchronization 50. Then, the power module 60 supplies the high-potential reference voltage VDD and the mid-potential reference voltage HVDD to the source drive ICs SIC#1 to SIC#8 (S811).

After receiving the high-potential reference voltage VDD, the first to eighth source drive ICs SIC#1 to SIC#8 generate gamma reference voltages GMA. Then, the first to eighth source drive ICs SIC#1 to SIC#8 supply the gamma reference voltages GMA and the mid-potential reference voltage HVDD to the data lines DL.

As described above, the synchronization unit 50 of the liquid crystal display device according to an embodiment of the present invention outputs a DPM signal only when both the first and second sets of data drivers 31 and 32 output high-logic lock signals. That is, in accordance with the EPI protocol, the synchronization unit 50 outputs a DPM signal when data transmission is possible between the first and second sets of data drivers 31 and 32 and the timing controller 20. Accordingly, if any of the first and second sets of data drivers 31 and 32 is not available for EPI protocol-based communication, the synchronization unit 50 outputs no DPM signal. As a consequence, the power module 60 receives no DPM signal and generates no high-potential reference voltage VDD and no mid-potential reference voltage HVDD, and therefore, the first and second sets of data drivers 31 and 32 do not receive the high-potential reference voltage VDD and the mid-potential reference voltage HVDD. Accordingly, the first and second sets of data drivers 31 and 32 supply no high-potential reference voltage VDD and no mid-potential reference voltage HVDD to the data lines DL.

That is to say, the liquid crystal display device according to an embodiment of the present invention may reduce or prevent the first and second sets of data drivers 31 and 32 from supplying a data voltage and a mid-potential reference voltage HVDD if any of the first and second sets of data drivers 31 and 32 is not available for communication. As a result, even if current flows to the data lines DL through one set of source drive ICs, the other source drive ICs may be prevented from receiving a sinking current via the data lines, thus preventing the source drive ICs from being burnt due to the sink current.

Moreover, in the liquid crystal display device according to an embodiment of the present invention, after the power voltage VCC is supplied to the source drive ICs SIC#1 to SIC#8, the high-potential reference voltage VDD is then supplied to them through the power module. Thereafter, the source drive ICs SIC#1 to SIC#8 are able to generate the gamma voltages GMA using the high-potential reference voltage VDD, which enables procedure of power supply for operating the source drive ICs SIC#1 to SIC#8 to be beneficially performed.

As discussed above, the power module is put into operation after each set of data drivers connected to two opposite sides becomes available for communication with the timing controller. Thus, an operational failure of any data drive IC may not cause the other data drivers to be burnt even when a voltage is supplied only to one end of the data lines.

Thus far, the principles of the present invention are explained in a case where data drivers and a timing controller transmit video data and control signals under an EPI protocol. However, it should be appreciated that the principles of the present invention can also be applied to various types of data transmission protocols.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:

a first data driver and a second data driver, each checking availability of a data transmission with a timing controller upon receiving a power voltage;

a synchronization circuit that outputs a power management signal when both the first and second data drivers become available for their data transmission with the timing controller; and a power circuit that supplies a high-potential voltage to the first and second data drivers in response to the power management signal output from the synchronization unit, wherein the first data driver transmits a first lock signal to the timing controller when its data transmission with the timing controller is available, and the second data driver transmits a second lock signal to the timing controller when its data transmission with the timing controller is available, and wherein the synchronization unit receives the power management signal and the first and second lock signals from the timing controller, and when the first and second lock signals have a same logic level, outputs the power management signal to the power module.

2. The display device of claim 1, wherein the power management signal is a dynamic power management (DPM) signal.

3. The display device of claim 1, wherein the synchronization unit is included in the timing controller.

4. The display device of claim 1, wherein the first and second data drivers are electrically connected to a data line from its two opposite ends.

5. The display device of claim 1, wherein the first and second data drivers supply a data voltage simultaneously to the data line.

6. The display device of claim 1, wherein the first and second data drivers perform their data transmission with the timing controller in accordance with an Embedded Panel Interface (EPI) protocol.

7. The display device of claim 6, wherein the timing controller converts a control data and a digital video data embedded with a clock into differential signal pairs and transmits the differential signal pairs to the first and second data drivers.

8. The display device of claim 7, wherein each of the first and second data drivers recovers an internal clock based on the differential signal pairs and samples data bits of the digital video data in accordance with the internal clock.

9. The display device of claim 1, wherein the synchronization unit includes a logical AND operator.

10. The display device of claim 1, wherein the first data driver transmits a first lock signal to a third data driver next to the first data driver provided at a same side of the display device when its data transmission with the timing controller is available.

11. The display device of claim 10, wherein the third data driver transmits the first lock signal to the timing controller when its data transmission with the timing controller is available.

12. The display device of claim 1, wherein each of the first and second data drivers includes a clock recovery circuit that outputs an internal clock signal.

13. The display device of claim 12, wherein the internal clock signal is generated after receiving the power voltage.

14. The display device of claim 13, wherein when the internal clock signal is stably generated, each of the first and second data drivers outputs a lock signal.

15. The display device of claim 1, wherein after receiving the high-potential voltage, each of the first and second data drivers converts a digital video data into an analog video voltage using a plurality of gamma reference voltages.

16. The display device of claim 15, wherein the analog video voltage is transmitted to a same data line.

17. A method of driving a display device, the method comprising:

generating a power management signal when a data transmission between a timing controller and a data driver is available;

outputting a power management signal when the data driver becomes available the data transmission with the timing controller; and supplying a high-potential voltage to the data driver in response to the power management signal, wherein the data driver includes first and second data drivers, the first data driver transmits a first lock signal to the timing controller when its data transmission with the timing controller is available, and the second data driver transmits a second lock signal to the timing controller when its data transmission with the timing controller is available, and wherein a synchronization circuit receives the power management signal and the first and second lock signals from the timing controller, and when the first and second lock signals have a same logic level, outputs the power management signal to the power module.

18. The method according to claim 17, further comprising converting a digital video data into an analog video voltage using a plurality of gamma reference voltages after receiving the high-potential voltage.

* * * * *